3,089,860
STABILIZED POLYOLEFIN COMPOSITIONS
Bernard O. Baum, Plainfield, and Cal Y. Meyers, Princeton, N.J., assignors to Union Carbide Corporation, a corporation of New York
No Drawing. Filed Dec. 3, 1958, Ser. No. 777,862
4 Claims. (Cl. 260—45.7)

This invention relates to polyolefin compositions having improved stability at elevated temperatures. More particularly, it relates to improved polypropylene compositions which are capable of withstanding high temperatures without undue molecular degradation.

One of the principal reasons for the continuing interest in polypropylene by those concerned with industrial synthetic polymers is that its relatively high melting point, of the order of 170 to 180° C., indicates a potential use for this polymer in the fabrication of articles of commerce which remain dimensionally unchanged at temperatures appreciably higher than can be tolerated by articles formed from polyethylene.

Unlike polyethylene, however, which has a melting point of from about 105 to 135° C. depending upon the method of polymerization employed, polypropylene is extremely susceptible to thermal degradation at high temperatures and cannot in fact withstand the ordinary hot compounding and processing operations without sustaining serious impairment of its physical properties. The term "high temperatures" as used herein is intended to mean temperatures of the order of 500° F. (260° C.) and above. Temperatures of this magnitude are necessary to carry out many of the conventional forming processes, e.g., injection molding, with polypropylene because of the high melting point of this polymer. At these temperatures the molecular degradation is so severe as to reduce the physical properties to unacceptable levels.

A well known general approach in attempting to prevent undue thermal degradation in circumstances such as described above is to admix with the given polymer a material which, in a manner not completely understood, exerts a stabilizing influence on the polymer. Although polyethylene is in many ways similar to polypropylene in physical and chemical properties, it has been found that many stabilizers highly effective in the case of polyethylene are completely unsuitable as stabilizers for polypropylene. In some instances generally excellent polyethylene stabilizers have been found actually to aggravate the instability of polypropylene at the high temperatures concerned in the present invention.

It is therefore the general object of the present invention to provide a polypropylene composition which is capable of withstanding elevated temperatures without undue molecular degradation.

It is a further object to provide a polypropylene composition which can be formed at suitably high temperatures with no significant reduction in appearance, strength properties or electrical characteristics.

These and other objects which will be obvious from the specification are accomplished in accordance with the present invention by admixing the polypropylene in a small amount of a compound capable of supplying free radicals to the composition and being selected from the group consisting of tetraphenylsuccinodinitrile and triphenylmethane.

The polypropylene compositions containing one or more of the stabilizing compounds described above sustain in general a greatly lessened degree of molecular weight degradation when exposed to high temperatures than otherwise is the case when polypropylene alone is so thermally treated. Tetraphenylsuccinodinitrile is particularly effective and virtually eliminate thermal degradation altogether. These stabilizers on the other hand do not substantially alter the strength or electrical properties of the polymer.

The energy absorbed by polypropylene when subjected to mechanical working and/or elevated temperatures causes the polymer molecule to break apart or degrade. It is believed that this molecular scission reaction proceeds by a free radical mechanism—that is, some of the electron pairs are disrupted whereby there exists unpaired electrons—and since such an electronic configuration is extremely reactive, these sites in the polymer chains act as the focal points from which the scission reaction is propagated with great rapidity. It is therefore believed, although we do not wish to be bound by any particular theory, that the stabilizers of this invention act by blocking the polypropylene free radicals by themselves forming relatively stable free radicals which react with and thereby inactivate the polypropylene free radicals.

Small quantities of these stabilizers have been found to be adequate to effectively stabilize polypropylene at high temperatures. The preferred amount employed is in the range of about 0.01 to about 2.0 parts by weight per 100 parts by weight of polypropylene. Particularly preferred amounts are in the range of about 0.05 to about 0.5 part stabilizer per 100 parts polymer on a weight basis.

Incorporation of the stabilizing material in the polymeric propylene is accomplished by conventional methods using such apparatus as a roll mill, Banbury mixer, or the like. Advantageously the polypropylene is mechanically worked at a temperature only just sufficiently high, i.e., about 170 to 180° C., to attain a fluxed material of formable consistency before the stailizer is added. This procedure permits a minimum of processing to obtain an intimate mixture of the composition constituents.

The excellent stabilizing action at high temperatures of the stabilizing compounds of the present invention is all the more surprising since it has been found that they do not effectively stabilize polypropylene at lower temperatures. By way of illustration, 100 parts by weight of a propylene homopolymer having a melt index of 5 (as determined by ASTM test method D–1238–57T) and a density of 0.90 was fluxed and sheeted on a two roll mill at 170° C. Tetraphenylsuccinodinitrile in an amount of 0.5 part by weight was then added to the sheet on the mill and thoroughly mixed thereinto by successively removing the sheet from the rolls and end passing it through the nip of the mill rolls ten times. A portion of this composition was compression molded into a 30 mil plaque and suspended in a circulating air oven maintained at 150° C. Periodically the plaque was examined and subjected to a manually applied bending force. The plaque reacted to the induced stress in one of two ways—either showing no discernible ill effect, or crumbling into small powdery fragments. Embrittlement, as indicated by crumbling, occurred before 6 hours had elapsed.

A more detailed illustration of the invention is set forth in the following examples.

EXAMPLE I

One hundred parts by weight of a propylene homopolymer having a melt index of 5 (as determined by ASTM test method D–1238–57T) and a density of 0.9 was fluxed and sheeted on a two roll mill at 170° C. Tetraphenylsuccinodinitrile in an amount of 0.5 part by weight was then added to the sheet on the mill and blended by successively removing the sheet from the rolls and end-passing it through the nip of the mill rolls about ten times. The thermal stability of the composition at high temperatures was determined by placing a 10 gram sample of the composition on a preheated cylindrical metal cell formed by closing off the bottom (exit) orifice of an extrusion plastometer of the same design and dimensions as the melt index measuring apparatus described in ASTM D-1238-57T. The temperature of the preheated cell was 300° C. A plug weighing 100 grams was placed directly on the resin composition in the cell to act as a closure and the composition was kept in the cell at 300° C. for 15 minutes. At the end of this time, the melt index of the composition was determined to be about 10 (ASTM D-1238-57T).

EXAMPLE II

Compositions consisting of polypropylene and tetraphenylsuccinodinitrile and polypropylene and triphenylmethane were prepared according to the same procedures as set forth in Example I, were tested for embrittlement time and molecular degradation at high temperatures. Additionally a control sample was tested which consisted of polypropylene and 4,4'-thio bis(6-tert-butyl-m-cresol), the latter being generally regarded as an excellent thermal stabilizer for polyethylene. In all instances polypropylene having an initial melt index of 5 was used and the quantity of modifier employed was 0.5 part by weight per 100 parts by weight of polypropylene. The results are shown in Table I. Embrittlement time was determined by compression molding the compositions into 30 mil thick plaques and suspending these plaques in a circulating air oven at 150° C. Embrittlement is indicated by a crumbling of the plaque under a manually applied bending stress.

*Table I*

| Additive | Structure | Time to Embrittlement at 150° C. (hrs.) | Melt Index of Composition after 15 min. at 300° C. |
|---|---|---|---|
| None | | <6 | >100 |
| 4,4-thio bis(6-tert-butyl-m-cresol) | HO—⟨C₆H₂(t-C₄H₉)⟩—S—⟨C₆H₂(t-C₄H₉)⟩—OH (with CH₃ groups) | 24–48 | >>100 |
| tetraphenylsuccinodinitrile | NC—C(C₆H₅)₂—C(C₆H₅)₂—CN | <6 | 10 |
| triphenylmethane | (C₆H₅)₃C—H | <6 | 20 |

It is clear from the data of Table I that the stability at high temperatures of the novel compositions of the present invention is most surprising in view of the fact that the same free radical supplying compounds do not stabilize polypropylene at lower temperatures, e.g., 150° C. as shown by the time to embrittlement data. Even more surprising is the fact that 4,4'-thio bis(6-tert-butyl-m-cresol) does prevent embrittlement of polyethylene at 150° C. but is completely ineffectual (actually injurious) in polypropylene at high temperatures.

The foregoing examples are intended solely for the purposes of illustration and not by way of limitation. It is further to be understood that various other additives which do not impair the stabilizing action of the stabilizers of this invention may be incorporated into the composition in the conventional manner. Such additives include fillers, pigments, processing aids, lubricants, corrosion inhibitors, and the like.

The propylene polymers which are effectively stabilized at high temperatures in accordance with the present invention are those which are normally solid at room temperature and may be produced according to any of the several methods known in the art. Exemplary of such processes are those described in Australian patent application No. 6,365/55 to Phillips Petroleum Company, United States Patent No. 2,692,259 to Edwin F. Peters, and United States Patent No. 2,791,576 to Edmund Field.

What is claimed is:

1. A polypropylene composition stable toward molecular degradation at high temperatures which comprises normally solid polypropylene and a stabilizing amount of a free radical supplying compound selected from the group consisting of tetraphenylsuccinodinitrile and triphenylmethane.

2. The composition of claim 1 in which the free radical supplying compound is present in an amount of from about 0.01 to about 2.0 parts by weight per 100 parts by weight of said polypropylene.

3. A polypropylene composition resistant to molecular degradation at high temperatures which comprises normally solid polypropylene and tetraphenylsuccinodinitrile, said tetraphenylsuccinodinitrile being present in an amount of from about 0.05 to about 0.50 part by weight per 100 parts by weight of said polypropylene.

4. A polypropylene composition resistant to molecular degradation at high temperatures which comprises normally solid polypropylene and triphenylmethane, said triphenylmethane being present in an amount of from about 0.05 to about 0.50 part by weight per 100 parts by weight of said polypropylene.

References Cited in the file of this patent

UNITED STATES PATENTS

| | | |
|---|---|---|
| 2,434,662 | Latham et al. | Jan. 20, 1948 |
| 2,448,799 | Happoldt et al. | Sept. 7, 1948 |
| 2,481,278 | Ballard et al. | Sept. 6, 1949 |
| 2,706,189 | Pruitt et al. | Apr. 12, 1955 |
| 2,841,569 | Rugg et al. | July 1, 1958 |
| 2,889,306 | Hawkins et al. | June 2, 1959 |
| 2,915,495 | Stamatoff | Dec. 1, 1959 |
| 2,920,059 | MacDonald | Jan. 5, 1960 |
| 2,985,617 | Salyer et al. | May 23, 1961 |